(12) United States Patent
Uemura et al.

(10) Patent No.: US 6,943,493 B2
(45) Date of Patent: Sep. 13, 2005

(54) FLAT-PANEL DISPLAY AND FLAT PANEL DISPLAY CATHODE MANUFACTURING METHOD

(75) Inventors: Sashiro Uemura, Mie (JP); Junko Yotani, Mie (JP)

(73) Assignee: Noritake Co., Ltd., Aichi (JP)

( * ) Notice: Subject to any disclaimer, the term of this patent is extended or adjusted under 35 U.S.C. 154(b) by 25 days.

(21) Appl. No.: 10/316,331

(22) Filed: Dec. 11, 2002

(65) Prior Publication Data

US 2003/0127965 A1 Jul. 10, 2003

(30) Foreign Application Priority Data

Dec. 12, 2001 (JP) ........................................ 2001-378661

(51) Int. Cl.⁷ .......................... H01J 1/62; H01J 63/04; H01J 1/02; H01J 1/05; H01J 9/04
(52) U.S. Cl. ........................ 313/495; 313/309; 313/310; 313/311; 313/346 R; 313/351; 445/24; 445/46; 445/50; 445/51
(58) Field of Search ................................ 313/495, 311, 313/310, 309, 346 R, 351; 445/24

(56) References Cited

U.S. PATENT DOCUMENTS

| 6,239,547 | B1 | 5/2001 | Uemura et al. | |
|---|---|---|---|---|
| 6,545,396 | B1 * | 4/2003 | Ohki et al. | ................. 313/309 |
| 6,624,566 | B2 * | 9/2003 | Uemura et al. | ............. 313/496 |
| 6,650,061 | B1 * | 11/2003 | Urayama et al. | ......... 315/169.3 |
| 6,664,727 | B2 * | 12/2003 | Nakamoto | ................... 313/495 |
| 6,713,947 | B2 * | 3/2004 | Hirasawa et al. | ........... 313/313 |
| 2001/0025962 | A1 | 10/2001 | Nakamoto | |

FOREIGN PATENT DOCUMENTS

| CN | 1286500 A | 3/2001 |
|---|---|---|
| CN | 1309408 A | 8/2001 |
| JP | 05-211009 | 8/1993 |
| JP | 2000-123713 | 4/2000 |
| JP | 2000-348599 | 12/2000 |
| JP | 2001-250469 | 9/2001 |

* cited by examiner

Primary Examiner—Nimeshkumar D. Patel
Assistant Examiner—Matt Hodges
(74) Attorney, Agent, or Firm—Blakely Sokoloff Taylor & Zafman

(57) ABSTRACT

A flat-panel display includes a front glass, glass substrate, cathodes, gate electrodes, phosphor films, and anodes. The front glass has translucency at least partly. The substrate is placed to oppose the front glass through a vacuum space. The cathodes are formed on the substrate. The gate electrodes are placed in the vacuum space and spaced apart from the cathodes. The phosphor layers and anodes are formed on a surface of the front glass which opposes the substrate. Each cathode includes a metal member having many opening portions which is mounted on the substrate, and a conductive material containing carbon nanotubes filled in the mesh-like opening portions. A method of manufacturing a flat-panel display is also disclosed.

11 Claims, 5 Drawing Sheets

FLAT-PANEL DISPLAY AND FLAT PANEL DISPLAY CATHODE MANUFACTURING METHOD

BACKGROUND OF THE INVENTION

The present invention relates to a flat-panel display which emits light by bombarding electrons emitted from a field emission electron source against a phosphor and a method of manufacturing a flat-panel display cathode.

As one of the electron display devices, a flat-panel display such as an FED (Field Emission Display) or flat fluorescent display tube is available, which emits light by bombarding electrons emitted from an electron-emitting source serving as a cathode against a light-emitting portion formed from a phosphor formed on a counterelectrode. Recently, an electron-emitting source using carbon nanotubes has been proposed as an electron-emitting source for such a flat-panel display. In a conventional flat-panel display using carbon nanotubes as electron-emitting sources, a paste containing carbon nanotubes is printed on a cathode wiring layer formed on a substrate and used as a cathode.

In the above conventional flat-panel display, however, cathodes formed by printing vary in thickness or a surface undulation occurs, resulting in failure to form flat cathodes. In such a case, when field electron emission is caused by using parallel electric fields, the electric fields are not uniformly applied between the cathodes or within the cathode surfaces, resulting in the nonuniform amount of electrons emitted. This causes luminance irregularity. In addition, local electron emission occurs to make the electron emission amount unstable, causing a luminance variation.

SUMMARY OF THE INVENTION

It is an object of the present invention to provide a flat-panel display which is free from luminance irregularity even if cathodes are formed by printing a paste containing carbon nanotubes, and a method of manufacturing the flat-panel display.

In order to achieve the above object, according to the present invention, there is provided a flat-panel display comprising a front glass having translucency at least partly, a substrate placed to oppose the front glass through a vacuum space, a cathode formed on the substrate, a gate electrode placed in the vacuum space and spaced apart from the cathode, and a phosphor layer and an anode formed on a surface of the front glass which opposes the substrate, wherein the cathode includes a metal member having many opening portions and mounted on the substrate, and a conductive material containing carbon nanotubes filled in the mesh-like opening portions.

DESCRIPTION OF THE PREFERRED EMBODIMENTS

The present invention will be described in detail below with reference to the accompanying drawings.

Figure 1A:
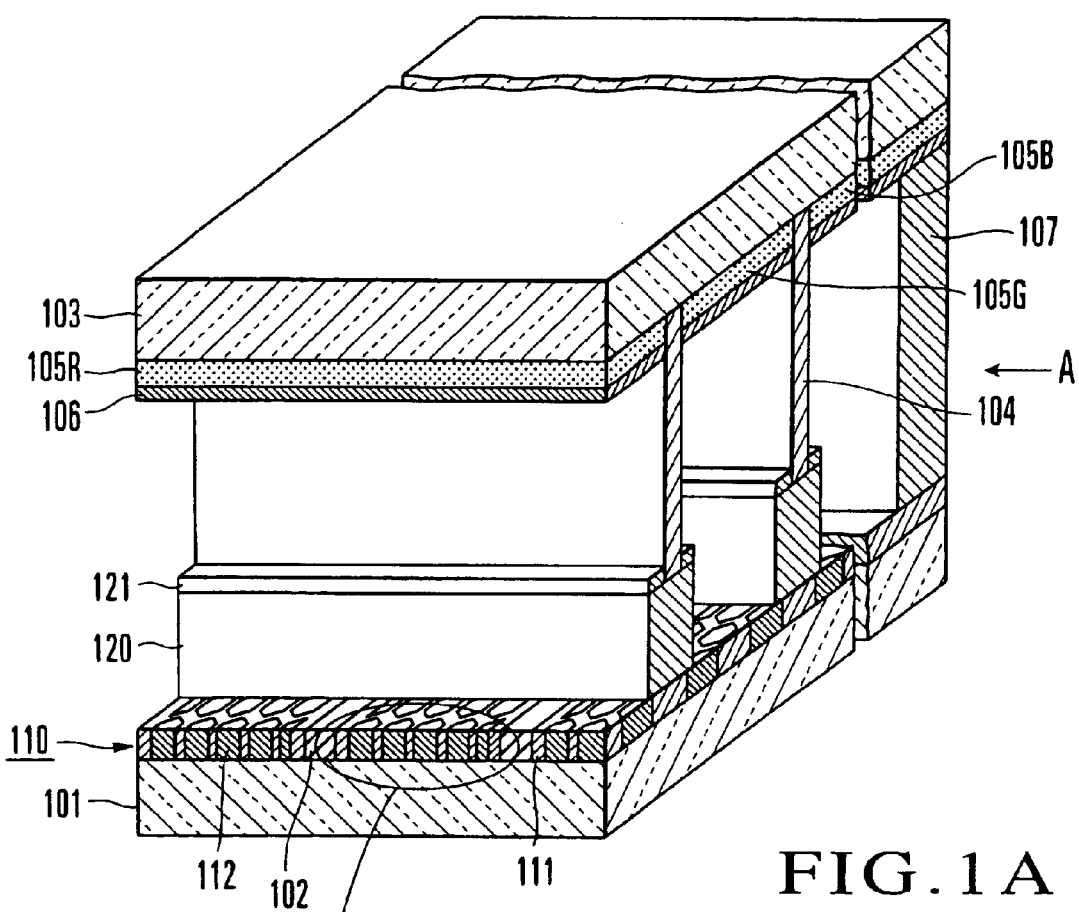
FIG. 1A is a perspective view showing the main part of a flat-panel display according to the first embodiment of the present invention.
Figure 1B:
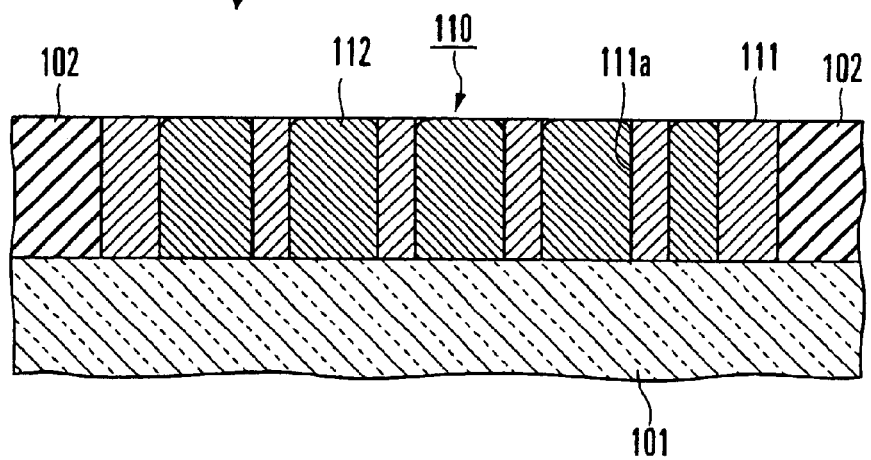
FIG. 1B is a sectional view of a cathode portion in FIG. 1A.

FIGS. 1A and 1B show the arrangement of a flat-panel display according to the first embodiment of the present invention. As shown in FIG. 1A, the flat-panel display according to this embodiment includes a glass substrate 101 having a substantially rectangular shape when viewed from the top, a transparent front glass 103 which is placed to oppose the glass substrate 101 at a predetermined distance and has a substantially rectangular shape when viewed from the top, and a frame-like spacer glass 107 placed on the peripheral portions of these components. The spacer glass 107 is bonded to the peripheral portions of the glass substrate 101 and front glass 103, which are placed to oppose each other, with low-melting frit glass to form an envelope. The envelope is held at a vacuum degree of $10^{-5}$ Pa. Low alkaline soda glass is used for the glass substrate 101, front glass 103, and spacer glass 107 which constitute the envelope. Plate glass members each having a thickness of 1 to 2 mm are used as the glass substrate 101 and front glass 103.

A plurality of substrate ribs 102 which are parallel to each other are formed on one surface of the glass substrate 101 at predetermined intervals. The surface of the glass substrate 101 is partitioned into a plurality of areas isolated from each other by the substrate ribs 102. As shown in FIG. 1B, strip-like cathodes 110 each having a width equal to the interval between the ribs are formed in the areas on the glass substrate 101 which are sandwiched between the substrate ribs 102 to have the same height (thickness) as that of the substrate rib 102. The substrate rib 102 is an insulator having a rectangular cross-section which is formed by repeatedly screen-printing an insulating paste containing low-melting frit glass on the glass substrate 101 until it reaches a predetermined height (thickness) and then calcining the paste.

The cathode 110 is comprised of a mesh-like metal plate 111 having many mesh-like opening portions 111a and electron-emitting portions 112 formed in the mesh-like opening portions 111a. The electron-emitting portions 112 in the mesh-like opening portions 111a are formed such that their thicknesses are almost uniform and their surfaces do not protrude from the mesh-like opening portions 111a. The height of the substrate rib 102 is set to be equal or smaller than that of the mesh-like metal plate 111 so that the interval between the electron-emitting portion 112 and a conductive film 121 (to be described later) serving as a gate electrode can be defined by only a spacer member.

More specifically, the height of the substrate rib 102 is preferably set to be equal to that of the mesh-like metal plate 111 or smaller than that by at least 0.05 mm in order to prevent electric discharge between itself and the mesh-like metal plate 111. In this embodiment, as described above, the height of the mesh-like metal plate 111 was set to be equal to that of the substrate rib 102, the pitch of the substrate ribs 102 was set to 1 to 2 mm, and the width of the substrate rib 102 was set to 0.05 mm.

A plurality of front-surface ribs 104 are formed upright on the opposite surface of the front glass 103 to the glass substrate 101 at predetermined intervals in a direction perpendicular to the array direction of the substrate ribs 102 and cathodes 110. Strip-like phosphor films 105B, 105G, and 105R are repeatedly formed on the surface of the front glass 103 so as to be arranged one by one in each area sandwiched between the front-surface ribs 104. Metal-backed films 106 serving as anodes are formed on the phosphor films 105B, 105G, and 105R (the opposite surfaces to the glass substrate 101). The front-surface rib 104 is an insulator having a rectangular cross-section which is formed by repeatedly screen-printing an insulating paste containing low-melting frit glass at a predetermined position on the inner surface of the front glass 103 until it reaches a predetermined height and then calcining the paste.

The phosphor films 105B, 105G, and 105R are made of phosphors having predetermined emission colors and formed by screen-printing phosphor pastes of the respective colors on the surface of the front glass 103 in a striped pattern and calcining the pastes. The phosphor film 105R is a red emission phosphor film using a red emission phosphor used for red light. The phosphor film 105G is a green emission phosphor film using a green emission phosphor used for green light. The phosphor film 105B is a blue emission phosphor film using a blue emission phosphor used for blue light. These phosphor films are repeatedly formed in the order of the phosphor film 105R for red light, the phosphor film 105G for green light, and the phosphor film 105B for blue light.

A known oxide phosphor or sulfide phosphor which emits light by bombardment of electrons accelerated by a high voltage of 4 to 10 kV, which is generally used for a cathode ray tube or the like, can be used for the phosphor films 105R, 105G, and 105B for R, G, and B light beams. In this embodiment, three types of phosphor films which emit light beams of the primary colors, i.e., R, G, and B, are used for color display. However, the present invention is not limited to this, and one type of phosphor film may be used for monochrome display. The metal-backed films 106 are made of thin aluminum films each having a thickness of about 0.1 $\mu$m and formed on the surfaces of the phosphor films 105R, 105G, and 105B by using a known vapor deposition method.

Insulating spacers 120 each having a rectangular cross-section are arranged between the substrate ribs 102 and cathodes 110 on the glass substrate 101 and the front-surface ribs 104 of the front glass 103 in correspondence with the front-surface ribs 104. The insulating spacer 120 is formed from a 0.3-mm thick alumina substrate in which electron passage slits are formed at a predetermined pitch. The slits are formed by using a laser beam. Note that the insulating spacer 120 is not limited to an alumina substrate, and another ceramic substrate or glass substrate may be used. Obviously, the thickness of the insulating spacer 120 and the slit width can be changed as needed.

Figure 2:
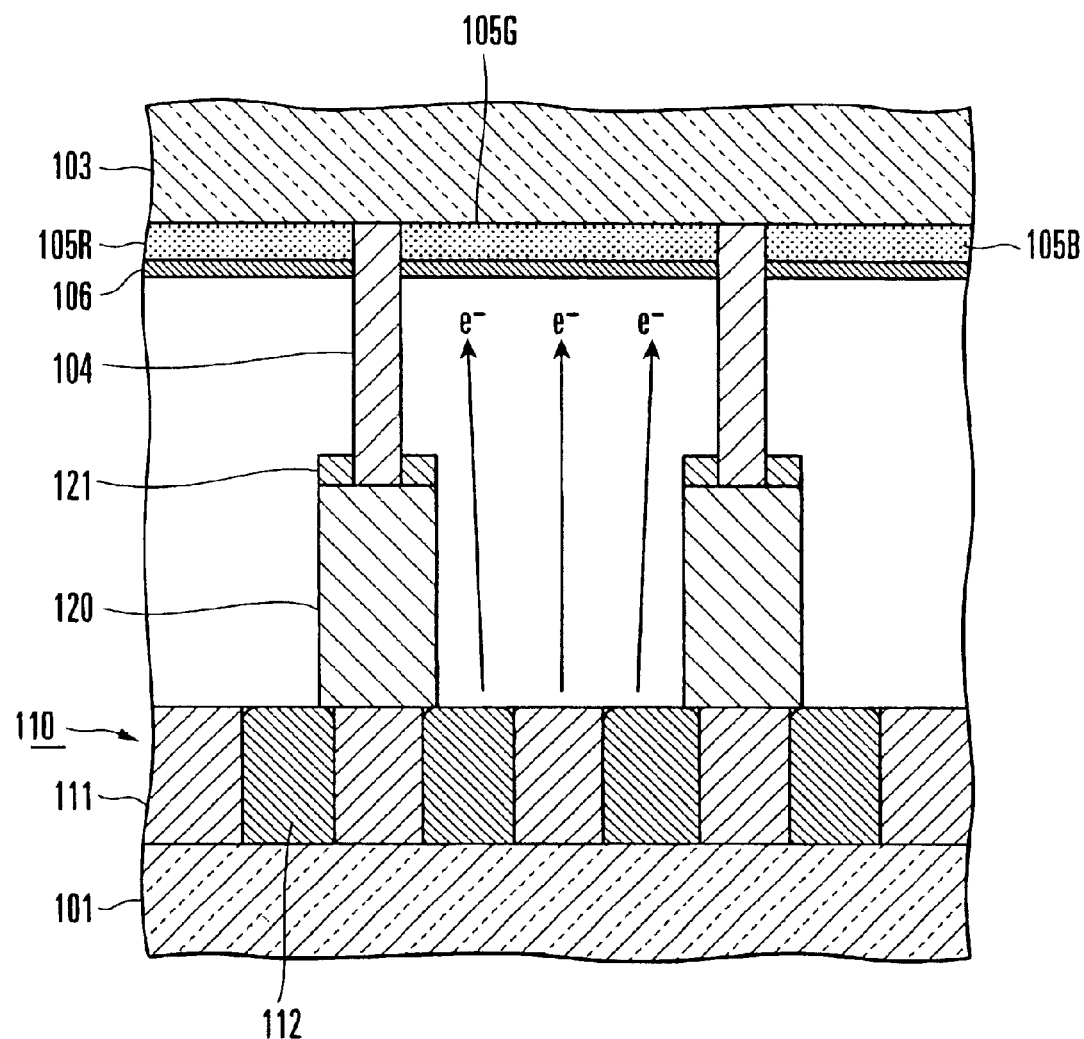
FIG. 2 is a partial sectional view taken along the direction indicated by an arrow A in FIG. 1A.

The insulating spacer 120 is wider than the front-surface rib 104 and placed such that the center line of the insulating spacer 120 coincides with that of the corresponding front-surface rib 104. As shown in FIG. 2, one pair of striped gate electrodes 121 are formed on the end face of the insulating spacer 120 on the two sides of the front-surface rib 104. The insulating spacer 120 is pressed by the atmospheric pressure and fixed between the front-surface rib 104 and the mesh-like metal plate 111. The insulating spacers 120 support the front glass 103 via the front-surface ribs 104 and also support the gate electrodes 121 apart from the cathode 110.

The front-surface rib 104 has a height that sets a gap of 2.0 to 4.0 mm between the gate electrodes 121 and the metal-backed film 106, and the pitch of the front-surface ribs 104 is set to be the same as that of the substrate ribs 102. Note that the front-surface rib 104 is not limited to this. The width of the front-surface rib 104 may be so set as to prevent breakdown between the adjacent metal-backed films 106 and the adjacent gate electrodes 121 and support the atmospheric pressure. The height of the front-surface rib 104 may be changed in accordance with the anode voltage applied to the metal-backed film 106. In addition, the intervals between the ribs may be changed as needed.

The gate electrode 121 is a conductive film which is formed by screen-printing a conductive paste containing silver or carbon as a conductive material into a striped pattern having a thickness of about 10 $\mu$m on the insulating spacer 120 and calcining the paste. In this embodiment, the gate electrode 121 is formed from a striped conductive film formed on the insulating spacer 120. However, the gate electrode 121 is not limited to this. For example, ladder- or mesh-like thin metal films may be formed to oppose the phosphor films 105B, 105G, and 105R and supported by the insulating spacers 120 to be spaced apart from the electron-emitting portions 112.

The mesh-like metal plate 111 protrudes outside through the envelope and serves as a cathode lead for externally applying a cathode voltage. Each gate electrode 121 is connected to a corresponding gate electrode lead (not shown) extending through the envelope. A predetermined control voltage is externally applied to each gate electrode 121. The metal-backed film 106 is connected to one anode lead (not shown) extending through the envelope. An anode voltage for accelerating electrons is externally applied to the metal-backed film 106.

The mesh-like metal plate 111 which constructs the cathode 110 is formed from a mesh-like thin metal plate having regular hexagonal meshes. For example, a stainless steel plate having a thickness of 0.1 to 0.15 mm is etched to form mesh-like through holes each having an opening size (the distance between opposite sides) of 0.1 to 1.0 mm with the opening portion 111a having a regular hexagonal shape. Note that the shape of the opening portion 111a of the mesh-like metal plate 111 is not limited to a regular hexagonal shape. For example, the mesh-like metal plate 111 may be formed into a ladder-like pattern having rectangular through holes formed at predetermined intervals. Alternatively, the opening portion 111a may be formed into a polygonal shape such as a triangular or rectangular shape, a polygonal shape with round corners, or a circular or elliptic shape.

The electron-emitting portion 112 is a field emission electron source which emits electrons upon application of a high electric field. The electron-emitting portion 112 is formed by filling the opening portion 111a of the mesh-like metal plate 111 with a conductive paste containing carbon nanotubes by printing. This electron-emitting portion 112 is comprised of a conductive film filled in the opening portion 111a of the mesh-like metal plate 111 and many carbon nanotubes exposed from the surface of the conductive film. The surface of the conductive film is exposed in the opening portion 111a of the mesh-like metal plate 111, and the many carbon nanotubes exposed from the conductive film surface function as an electron-emitting source.

Each carbon nanotube has a structure in which a single graphite layer is closed into a cylindrical shape, and a five-membered ring is formed on the distal end portion of the cylinder. The carbon nanotube has a small diameter of 4 to 5 nm, and hence can emit electrons by field emission upon application of an electric field of about 100 V. Note that the structures of carbon nanotubes include a single-layer structure and a coaxial multilayer structure in which a plurality of graphite layers are stacked in a nesting pattern and each graphite layer is closed into a cylindrical shape. Either of the structures can be used. Alternatively, a hollow graphite tube having a defect due to structural disturbance or a graphite tube filled with carbon may be used.

In the flat-panel display having the above arrangement, a potential difference is set between the cathode 110 and the gate electrode 121 such that a positive potential is set at the gate electrode 121. With this setting, an electric field concentrates on the carbon nanotubes of the electron-emitting portion 112 at the intersection of the gate electrode 121 and cathode 110. As a consequence, a high electric field is applied to the carbon nanotubes, which in turn emit electrons from their distal ends. In this case, when a positive voltage (accelerating voltage) is applied to the metal-backed film 106, the electrons emitted from the electron-emitting portion 112 are accelerated toward to the metal-backed film 106. The accelerated electrons are transmitted through the metal-backed film 106 and collide with the phosphor films 105B, 105G, and 105R. The phosphor films 105B, 105G, and 105R then emit light.

Assume that an n×m dot matrix display unit is formed by forming n gate electrodes 121 in the row direction, and m cathodes 110 in the column direction. In this case, while a positive voltage (accelerating voltage) is applied to the metal-backed film 106, a positive voltage is applied to the gate electrode 121 in the first row, and a negative voltage is applied to the first to mth cathodes 110 to sequentially scan the display addresses in the first to mth columns. This operation is repeated from the first to nth gate electrodes 121 to perform dot matrix display. In this case, 0 V is applied to the cathodes 110 and gate electrodes 121 to which no voltage is applied, or a negative bias voltage of several V with respect to the cathodes 110 is applied to the gate electrodes 121 to prevent the electron-emitting portions 112 other than those at the display addresses from emitting electrons.

In addition, 0 V and a position voltage may be applied to the cathode 110 in such a manner that 0 V is applied to it to emit light, and a positive voltage is applied to it to emit no light. In this case, with regard to the gate electrodes 121, an active row is held at a positive voltage, and 0 V or a negative bias voltage of several V is applied to the remaining rows to prevent the electron-emitting portions 112 other than those at the display addresses from emitting electrons. In this embodiment, the voltage applied to the metal-backed film 106 was set to 6 kV, the voltages applied to the gate electrode 121 were set to 500 V and 0 V, and the voltages applied to the gate electrode 121 were wet to 500 V and 0 V. In this case, since no negative voltage is used, no negative voltage source is required, resulting in a reduction in cost.

A method of manufacturing the flat-panel display having the above arrangement will be described next.

[Formation of Cathodes]

Figure 3A:
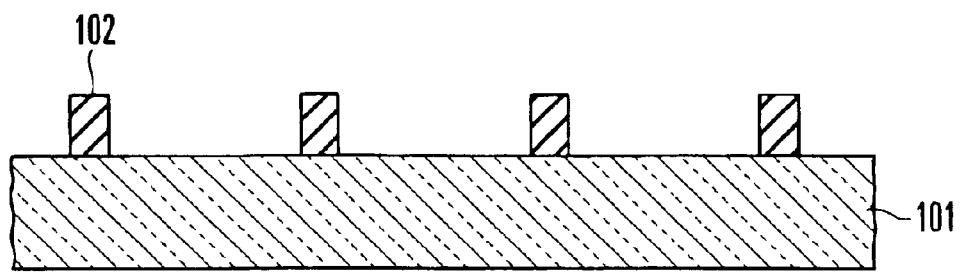
FIGS. 3A to 3D are sectional views showing a method of manufacturing cathodes.

First of all, as shown in FIG. 3A, the substrate ribs 102 are formed on the glass substrate 101 at predetermined intervals. The substrate rib 102 is formed by repeatedly screen-printing an insulating paste containing low-melting frit glass on the glass substrate 101 until it reaches a predetermined height and then calcining the paste.

Figure 3B:
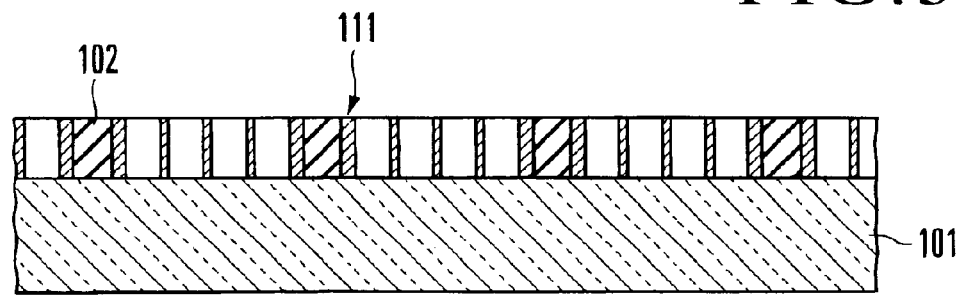
Figure 3C:
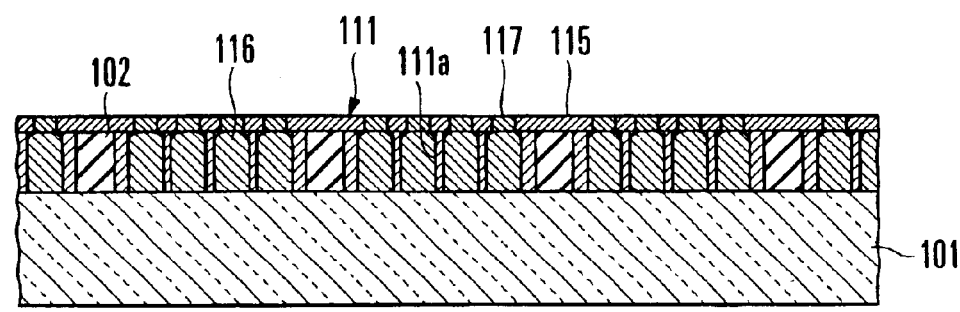

As shown in FIG. 3B, the mesh-like metal plates 111 are stuck on the glass substrate 101 between the adjacent substrate ribs 102. As shown in FIG. 3C, after a print screen 115 is stuck on the mesh-like metal plates 111, each mesh-like opening portion 111a of the mesh-like metal plates 111 is filled with a conductive paste 116 containing carbon nanotubes by screen printing. In this case, the print screen 115 has print patterns 117 exhibiting one-to-one correspondence with the opening portions 111a of the mesh-like metal plates 111. The print pattern 117 has a planar shape similar to the shape of the opening portion 111a and the same size as that of the opening portion 111a or a size reduced at a predetermined ratio.

As the conductive paste 116 containing carbon nanotubes, a paste obtained by kneading a needle-shaped bundle (columnar graphite) having a length of several 10 $\mu$m and mainly containing carbon nanotubes with a silver paste (a conductive viscous solution) at a mixing ratio of 1:1 is used. The silver paste is a paste having fluidity which is obtained by dispersing glass particles with a particle diameter of about 1 $\mu$m and silver particles with a particle diameter of about 1 $\mu$m in a viscous vehicle dissolved by using a resin as a solvent. As the vehicle, a material that easily dissolves and volatilizes is used. The vehicle is removed by heating the paste in the atmosphere at about 300 to 400° C. In addition, as the glass particles, particles that dissolve at about 300 to 400° C. are used.

The print screen 115 is then removed, and the resultant structure is heated at about 450° C. for a predetermined period of time to calcine the conductive paste containing carbon nanotubes in each mesh-like opening portion 111a. With this process, a conductive film containing a bundle in each mesh-like opening portion 111a is formed. Since opening portions each having a small opening diameter of 0.1 to 1.0 mm are formed in this conductive film, when glass particles melt upon being heated in the calcining process, no surface undulation occurs, and the surface is uniformly planarized. As a consequence, a flat conductive film with little variation in thickness can be obtained.

The surface of the conductive film is then irradiated with a laser beam to selectively remove silver particle and binder on the surface by evaporation, thereby exposing the bundles. At the same time, only the carbon nanotubes are uniformly exposed from the surface of the conductive film by selectively removing polyhedral carbon particles as a carbon component other than carbon nanotubes on the bundle surfaces. Note that the method of exposing carbon nanotubes from the surface of a conductive film is a known method as indicated by FIGS. 7A to 7F in U.S. Pat. No. 6,239,547.

Figure 3D:
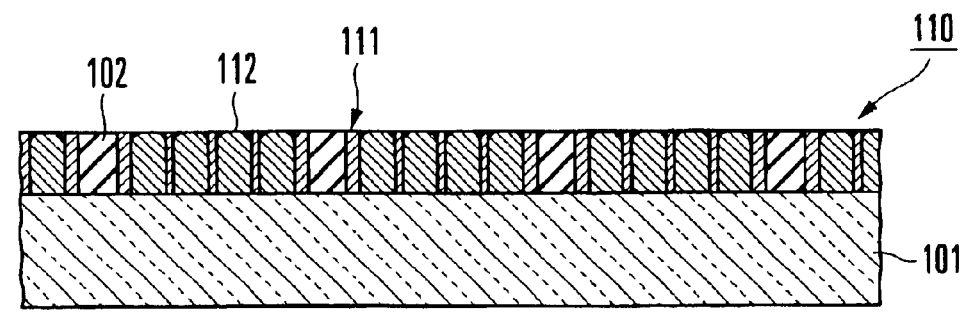

With this process, carbon nanotubes are distributed on only the surfaces of many mesh-like opening portions 111a, and as shown in FIG. 3D, the cathode 110 having the electron-emitting portions 112 formed from carbon nanotubes is formed on the glass substrate 101.

[Assembly of Flat-Panel Display]

Figure 4:
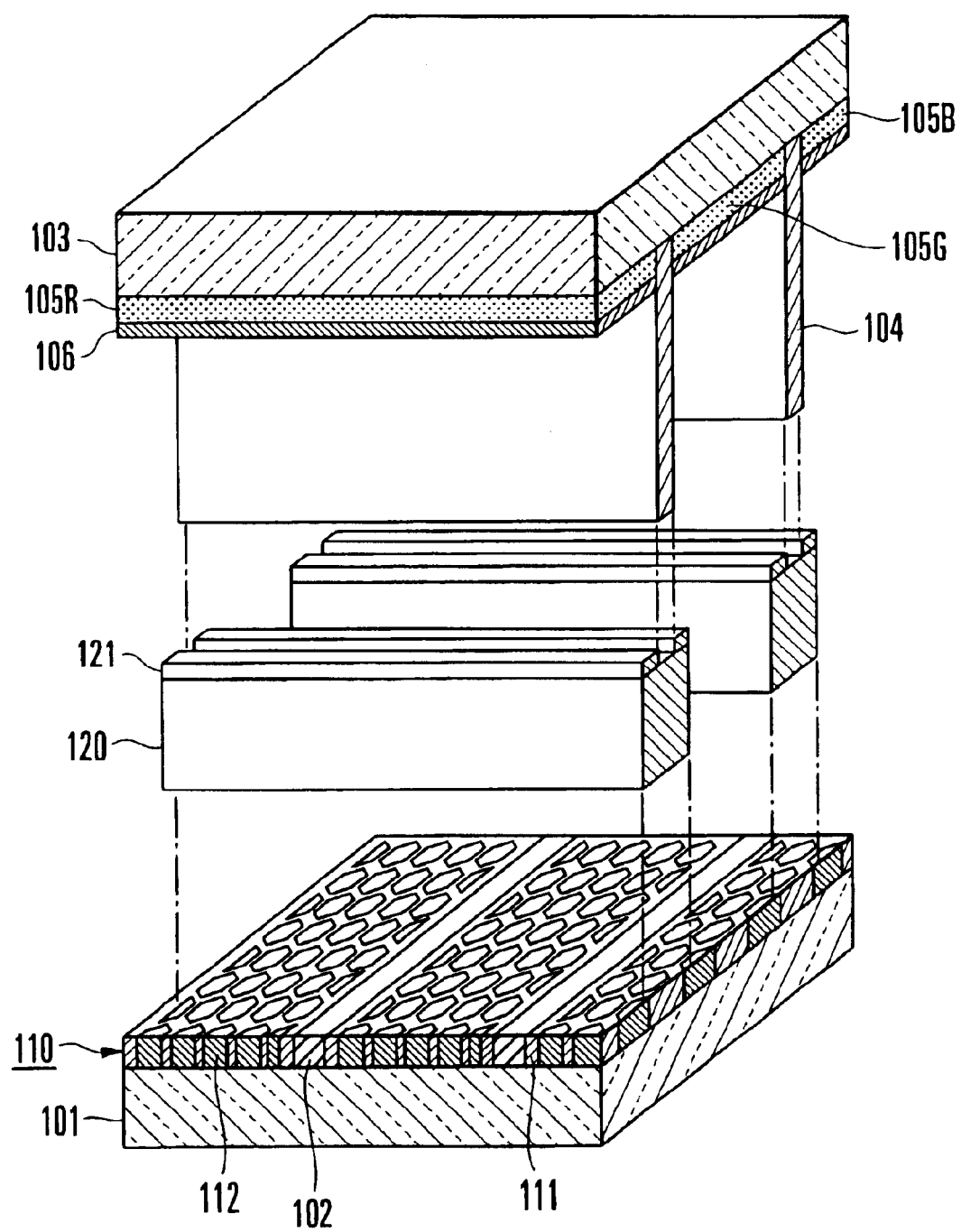
FIG. 4 is a perspective view for explaining a method of assembling the flat-panel display in FIGS. 1A and 1B.

As shown in FIG. 4, the insulating spacers 120 on which the gate electrodes 121 are formed are mounted on the glass substrate 101 on which the cathodes 110 are formed with the gate electrodes 121 facing up. At this time, the insulating spacers 120 are so arranged as to make the gate electrodes 121 become perpendicular to the cathodes 110.

After the frame-like spacer glass 107 is mounted on the peripheral portion of the glass substrate 101, the front glass 103 on which the phosphor films 105B, 105G, and 105R, metal-backed films 106, and front-surface ribs 104 are formed is mounted on the spacer glass 107. At this time, the front glass 103 is placed on the insulating spacers 120 such that the lower end face of each front-surface rib 104 is sandwiched between one pair of gate electrodes 121. The glass substrate 101, front glass 103, and spacer glass 107 are then bonded/fixed with low-melting frit glass to form an envelope. An exhaust port (not shown) formed in the spacer glass 107 is connected to a vacuum pump to evacuate the envelope to a predetermined pressure. The exhaust port is then sealed.

Figure 5:
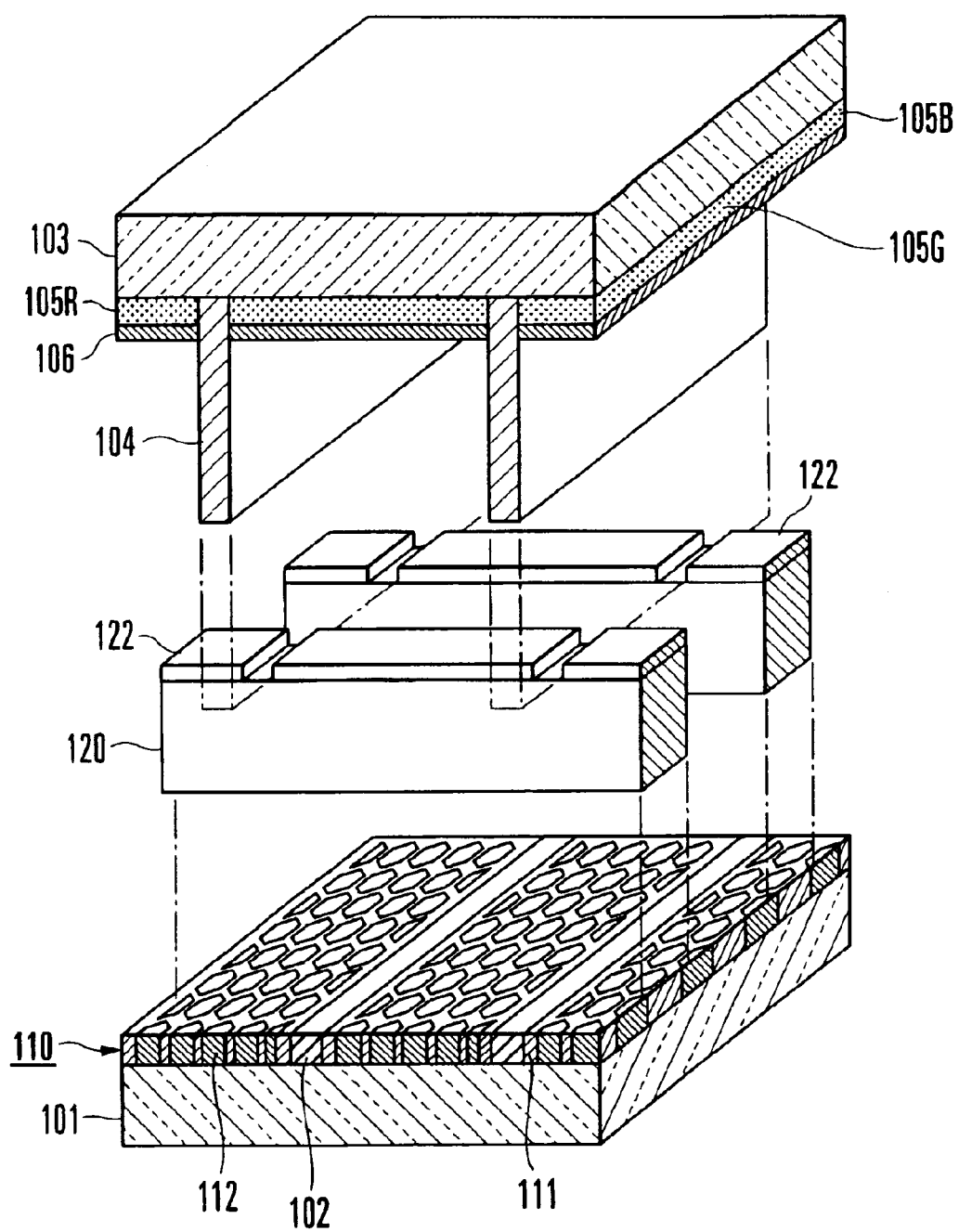
FIG. 5 is a perspective view showing the main part of a flat-panel display according to the second embodiment of the present invention.

FIG. 5 shows the structure of a flat-panel display according to the second embodiment of the present invention. As in this embodiment, front-surface ribs 104 may be formed in a direction perpendicular to insulating spacers 120. In this case, gate electrodes 122 formed on the insulating spacers 120 are formed from split electrodes which are split by the front-surface ribs 104 in the longitudinal direction of the insulating spacers 120 and electrically connected to each other.

In the above embodiment, the surface of the conductive film in each mesh-like opening portion 111a is irradiated with a laser beam to expose carbon nanotubes. However, a method of exposing carbon nanotubes is not limited to the laser beam irradiation method. For example, carbon nanotubes may be exposed by selective dry etching using a plasma. In addition, the glass substrate is used as a component of the envelope. However, a ceramic substrate or the like may be used.

Furthermore, the conductive paste 116 is obtained by kneading carbon nanotube bundles with a silver paste at a mixing ratio of 1:1. However, they may be kneaded at a different mixing ratio. Although a silver paste is used as the conductive paste 116 containing carbon nanotubes, other conductive pates may be used. For example, a conductive paste using silver/copper alloy particles may be used. Alternatively, a conductive polymer may be used.

As has been described above, according to the present invention, since conductive films containing carbon nanotubes serving as electron-emitting sources are formed in the mesh-like opening portions of mesh-like metal members that are processed to have a uniform thickness, the conductive films are planarized to have a uniform thickness. With this structure, uniform electric fields are applied to the carbon nanotubes, and electrons are uniformly emitted by field emission regardless of the positions. Therefore, uniform field electron emission is realized, and uniform luminance is obtained regardless of the pixels.

What is claimed is:

1. A flat-panel display comprising:
   a front glass having translucency at least partly;
   a substrate placed to oppose said front glass through a vacuum space;
   a cathode formed on said substrate;
   a gate electrode placed in the vacuum space and spaced apart from said cathode; and
   a phosphor layer and an anode formed on a surface of said front glass which opposes said substrate,
   wherein said cathode includes
   a metal member of uniform thickness mounted on said substrate, said metal member having a plurality of through holes which form a mesh-like pattern on a surface thereof, said plurality of through holes being filled with a conductive material containing carbon nanotubes,
   wherein the conductive material comprises a paste-like material obtained by mixing columnar graphite containing carbon nanotubes as a main ingredient with a viscous solution having conductivity at a predetermined ratio.

2. A display according to claim 1, further comprising an insulating spacer which is mounted on the metal member and supports said gate electrode.

3. A display according to claim 1, wherein
   said cathode comprises a plurality of strip-like electrodes arranged parallel to each other, and
   said gate electrode comprises a plurality of striped electrodes formed parallel to each other in a direction perpendicular to the strip-like electrodes.

4. A display according to claim 3, wherein the striped electrodes constituting said gate electrode comprise a plurality of split electrodes which are split in a longitudinal direction and electrically connected to each other.

5. A display according to claim 1, wherein the metal member comprises a mesh-like metal plate having a thickness equal to a height of a substrate rib formed on said substrate.

6. A display according to claim 1, wherein a thickness of the metal member is in a range of 0.1 mm to 0.15 mm, and a diameter of a through hole is in a range of 0.1 mm to 1.0 mm.

7. A flat-panel display comprising:
   a front glass of at least partial translucence with a phosphor layer and an anode located thereupon;
   a substrate parallel to the front glass and separated therefrom by a vacuum space;
   a gate electrode placed in the vacuum space and separated from the substrate;
   a cathode attached to the substrate and constructed of a metal plate having a plurality of through holes, the through holes being filled with a calcined, conductive mixture containing carbon nanotubes.

8. The flat panel display of claim 7, wherein the calcined, conductive mixture contains silver.

9. The flat panel display of claim 7, wherein the calcined, conductive mixture contains glass.

10. The flat-panel display of claim 7, wherein the metal plate is 0.1 mm to 0.15 mm in thickness, and the through holes are 0.1 mm to 1.0 mm in diameter.

11. The flat-panel display of claim 7, wherein the metal plate is made of stainless steel.

* * * * *